Patented Aug. 19, 1941

2,252,696

UNITED STATES PATENT OFFICE 2,252,696

METHOD OF PREPARING DIETHYLSTILBESTROL AND OTHER STILBENE DERIVATIVES, AND INTERMEDIATES THEREFOR

William Braker, Brooklyn, Morris A. Dolliver, Jackson Heights, Edward Pribyl, Long Island City, and Franklin A. Smith, Brooklyn, N. Y., assignors to E. R. Squibb & Sons, New York, N. Y., a corporation of New York No Drawing. Application May 26, 1939, Serial No. 275,794

10 Claims. (Cl. 260—613)

This invention relates to, and has for its object the provision of: (1) an efficient method of preparing compounds of the general formula HO—C$_6$H$_4$—C(lower-alkyl)=
C(lower-alkyl)—C$_6$H$_4$—OH —notably 4,4'-dihydroxy-$\alpha,\alpha'$-diethyl-stilbene (diethylstilbestrol)—; (2) certain process steps of general applicability; and (3) a novel intermediate for the production of diethylstilbestrol.

Diethylstilbestrol is a valuable therapeutic compound, being estrogenically active. It has priorly been prepared from desoxyanisoin by Dodds et al. [Nature 141, 247 (1938)], but their method is unsatisfactory in that it gives poor yields.

The method of this invention essentially involves the following schematically-represented conversions:

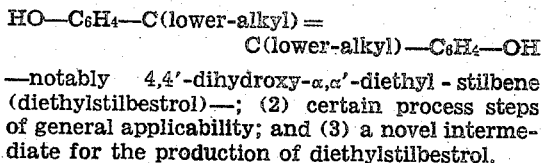

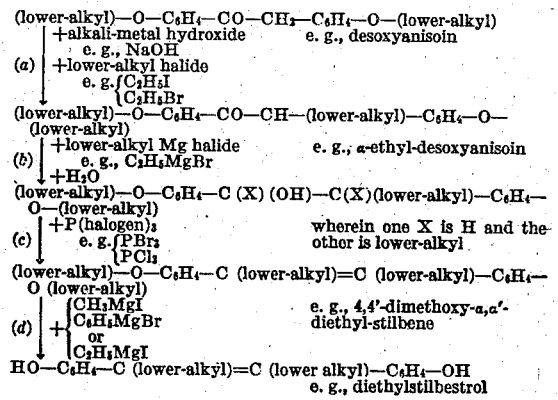

The intermediate obtained from $\alpha$-ethyl-desoxyanisoin by conversion b is apparently novel. The method of this invention will be explained in connection with the preparation of diethylstilbestrol from desoxyanisoin. The following examples are illustrative of the invention:

Example 1

(a) A mixture of 256 g. of desoxyanisoin, 44 g. of powdered sodium hydroxide, 171.5 g. of ethyl iodide, and 15 cc. of alcohol is refluxed and stirred for twelve hours, and then cooled; water is added to dissolve the sodium iodide formed; the oil layer is dissolved in ether and the ether layer separated, dried over sodium sulphate, and chilled in a carbon-dioxide-alcohol bath, to precipitate unreacted desoxyanisoin, which is filtered off; and the ether distilled from the filtrate. The residual oil is vacuum-distilled, and the fraction of boiling point 185–192° C. at 0.5 mm. is collected. The bulk of the fraction ($\alpha$-ethyl-desoxyanisoin) distills at 185–187° C. at 0.5 mm.

(b) 34.5 g. of magnesium suspended in 100 cc. of anhydrous ether is reacted with 152 g. of ethyl bromide contained in 500 cc. of anhydrous ether for over 1.5 hours while stirring. Then 263 g. of the $\alpha$-ethyl-desoxyanisoin in 200 cc. of anhydrous ether is added, with stirring, in one hour, and the mixture refluxed for 30 hours. The reaction mixture is then poured on 1 kg. of cracked ice and about 454 g. of ammonium chloride is added. The ether layer is separated, washed with water, dried over sodium sulphate; the ether is distilled; 300 cc. of petroleum ether is added to the warm residue, the solution is cooled; and the crystalline product is filtered, washed with petroleum ether, and vacuum-dried. A 90.3% yield of a white crystalline material of melting point 78–80° C. is obtained. This material may be further purified, but conveniently is used without further purification for the production of 4,4'-dimethoxy-$\alpha,\alpha'$-diethyl-stilbene, as described hereinafter. Purification may be effected by fractionally crystallizing the material from solution in 95% ethanol; on allowing the solvent to evaporate slowly at room temperature, there is first obtained a minute quantity of crystalline material melting at 114–16° C. (uncorr.); the major portion of the material, after two recrystallizations, melts at 85° C. (uncorr.). Both materials are embraced by the structural formula CH$_3$O-p-phenylene-C(X)(OH)—
C(X)(C$_2$H$_5$)-p-phenylene—OCH$_3$ wherein one X is H and the other is ethyl.

(c) 84 g. of the diethylated carbinol melting at 78–80° C. and 84 cc. of phosphorus tribromide are mixed and heated on a steam bath for four hours. The reaction mixture is poured into 500 cc. of water with stirring, and the crude product so obtained is filtered, washed with water, and crystallized from alcohol. 4,4'-dimethoxy $\alpha,\alpha'$-diethyl stilbene is thus obtained as a white crystalline material of melting point 122–123° C.

(d) 11.6 grams of magnesium is suspended in 100 cc. of ether, and a solution of 72 grams of methyl iodide in 250 cc. of ether is added with stirring. 60 grams of 4,4'-dimethoxy $\alpha,\alpha'$-diethyl stilbene is then added, and the ether is distilled from the mixture. The residue is heated and its temperature so controlled that the reaction temperature never rises above 175° C., the operation requiring frequent removal of the source of heat, the reaction period lasting for about an hour, during which ethane is evolved, and completion of the reaction being indicated by the cessation of evolution of ethane. The residue is decomposed with ice-water and hydrochloric acid, and the material so obtained is filtered, washed with water, and dissolved in dilute sodium hydroxide solution; the alkaline solution is filtered, the filtrate acidified with hydrochloric acid, and the precipitated product filtered, washed with water, and vacuum-dried. When recrystallized from acetic acid, diethylstilbestrol is obtained as a white crystalline material of melting point 167–168° C. (uncorr.)

*Example 2*

The conversion of desoxyanisoin into the mono-ethylated desoxyanisoin (conversion *a* in Example 1) may also be effected as follows: A mixture of 100 grams of desoxyanisoin, 18 grams of powdered sodium hydroxide, 58 g. of ethyl bromide, and 20 cc. of alcohol is refluxed for 24 hours, and then cooled, and water is added. The oil layer is extracted with ether, and the extracts are combined and dried over sodium sulphate. The ether solution is next chilled in a carbon-dioxide-alcohol bath, and the precipitated desoxyanisoin is filtered. The filtrate is distilled, leaving as residue a yellow oil, which is practically pure α-ethyl-desoxyanisoin.

*Example 3*

The conversion of the 4,4'-dimethoxy-α,α'-diethyl stilbene into diethylstilbestrol (conversion *d* in Example 1) may also be effected as follows: Ethyl magnesium iodide is prepared from 0.18 g. of magnesium and 1.16 g. of ethyl iodide in ether. The ether is distilled and the residue heated at 190° C. with 1 g. of the 4,4'-dimethoxy-α,α'-diethyl stilbene until no more propane is evolved. The reaction mixture is then treated with icewater and the mass is filtered, sodium hydroxide solution is added, and the alkali solution filtered. The filtrate is acidified with hydrochloric acid, which precipitates crude diethylstilbestrol. Crystallization of the latter yields purer material of melting point 163–4° C.

*Example 4*

Conversion *d* of Example 1 may also be effected as follows: Phenyl magnesium bromide is prepared from 0.18 g. of magnesium and 1.16 g. of bromobenzene in ether. 1 g. of 4,4'-dimethoxy-α,α'-diethyl stilbene is added, and the mixture evaporated to dryness in vacuo. The residue is heated at 220° C. for 0.5 hour, and treated with ice water, and the mass is filtered, dissolved in an aqueous solution of sodium hydroxide, which is then filtered. The filtrate is acidified with hydrochloric acid; the crude diethylstilbestrol, separated by filtration, melts at 153–160° C.

Manifestly the dealkylation procedure of Example 1(*d*) and Examples 3 and 4 will be effective with all compounds of the general formula (lower-alkyl)—O—C$_6$H$_4$—C(R)=C(R')—C$_6$H$_4$—O—(lower-alkyl), wherein R and R' represent each a member of the group consisting of hydrogen and lower-alkyl; furthermore, the dealkylation procedure may be used to produce diethylstilbestrol from 4,4'-dimethoxy-α,α'-diethyl-stilbene derived from other sources, e. g., from a compound obtained by the dehydration of the carbinol melting at 115–117° C. disclosed by Dodds et al., supra, which carbinol is apparently identical with that described in Example 1(*b*) supra as melting at 114–116° C. Also, it will be obvious that homologs of desoxyanisoin (wherein the methyl of the methoxy group is replaced by other lower-alkyl groups such as ethyl, propyl, or butyl) may be used in place of desoxyanisoin in Examples 1 and 2 to obtain diethylstilbestrol, and that homologs of diethylstilbestrol, i. e., compounds embodying lower-alkyl groups other than ethyl (inter alia, methyl, propyl, and butyl), may be prepared by using homologous lower-alkyl reactants for conversions *a* and *b* in the foregoing examples. Furthermore, the invention is obviously applicable to the production of compounds isomeric to diethylstilbestrol and its homologs; i. e., compounds wherein the hydroxy groups are in positions other than para to the linkage between the benzene nuclei, by starting with a compound correspondingly-isomeric to desoxyanisoin (or its homologs).

The invention may be variously otherwise embodied, within the scope of the appended claims.

We claim:

1. The method of preparing a compound of the general formula HO—C$_6$H$_4$—C(lower-alkyl)=C(lower-alkyl)—C$_6$H$_4$—OH which comprises reacting a compound of the general formula (lower-alkyl)—O—C$_6$H$_4$—CH$_2$—CO—C$_6$H$_4$—O—(lower-alkyl) with an alkali-metal hydroxide and a lower-alkyl halide, reacting the resulting mono-alkylated compound with a lower-alkyl magnesium halide and hydrolyzing the reaction product, reacting the resulting di-alkylated carbinol with a phosphorus trihalide, reacting the resulting dehydration product with a Grignard reagent of the group consisting of CH$_3$MgI, C$_6$H$_5$MgBr, and C$_2$H$_5$MgI, and hydrolyzing the reaction product.

2. The method of preparing a 4,4'-dihydroxy-α,α'-di-(lower-alkyl)-stilbene which comprises reacting desoxyanisoin with an alkali-metal hydroxide and a lower-alkyl halide, reacting the resulting mono-alkylated desoxyanisoin with a lower-alkyl magnesium halide and hydrolyzing the reaction product, reacting the resulting di-alkylated carbinol with a phosphorus trihalide, reacting the resulting dehydration product with a Grignard reagent of the group consisting of CH$_3$MgI, C$_6$H$_5$MgBr, and C$_2$H$_5$MgI, and hydrolyzing the reaction product.

3. The method of preparing diethylstilbestrol which comprises reacting desoxyanisoin with an alkali-metal hydroxide and an ethyl halide, reacting the resulting mono-ethylated desoxyanisoin with an ethyl magnesium halide and hydrolyzing the reaction product, reacting the resulting di-alkylated carbinol with a phosphorus trihalide, reacting the resulting dehydration product with a Grignard reagent of the group consisting of CH$_3$MgI, C$_6$H$_5$MgBr, and C$_2$H$_5$MgI, and hydrolyzing the reaction product.

4. The method of preparing a compound of the general formula HO—C$_6$H$_4$—C(lower-alkyl)=C(lower-alkyl)—C$_6$H$_4$—OH which comprises reacting a compound of the general formula (lower-alkyl)—O—C$_6$H$_4$—CH$_2$—CO—C$_6$H$_4$—O—(lower-alkyl) with solid sodium hydroxide and a member of the group consisting of lower-alkyl iodides and lower-alkyl bromides, reacting the resulting mono-alkylated compound with a lower-alkyl magnesium bromide and hydrolyzing the reaction product, reacting the resulting di-alkylated carbinol with a member of the group consisting of phosphorus tribromide and phosphorus trichloride, reacting the resulting dehydration product with a Grignard reagent of the group consisting of $CH_3MgI$, $C_6H_5MgBr$, and $C_2H_5MgI$, and hydrolyzing the reaction product.

5. The process of alkylating a compound of the general formula (lower-alkyl)—O—$C_6H_4$—$CH_2$—CO—$C_6H_4$—O—(lower-alkyl) which comprises reacting the compound with an alkali-metal hydroxide and a lower-alkyl halide.

6. The process of ethylating desoxyanisoin which comprises reacting desoxyanisoin with sodium hydroxide and a member of the group consisting of ethyl iodide and ethyl bromide.

7. The process of dealkylating a compound of the general formula (lower-alkyl)—O—$C_6H_4$—$C(R)=C(R')$—$C_6H_4$—O—(lower-alkyl), wherein R and R' represent a member of the group consisting of hydrogen and lower-alkyl, which comprises reacting the compound with a Grignard reagent of the group consisting of $CH_3MgI$, $C_6H_5MgBr$, and $C_2H_5MgI$, and hydrolyzing the reaction product.

8. The process of demethylating 4,4'-dimethoxy-$\alpha,\alpha'$-diethyl-stilbene, which comprises reacting it with $CH_3MgI$, and hydrolyzing the reaction product.

9. A composition melting at about 78 to 80° C. consisting of compounds embraced by the structural formula $CH_3O$-p-phenylene-$C(X)(OH)$—$C(X)(C_2H_5)$-p-phenylene-$OCH_3$ wherein one X is H and the other $C_2H_5$.

10. A compound having the structural formula $CH_3O$-p-phenylene-$C(X)(OH)$—$C(X)(C_2H_5)$-p-phenylene-$OCH_3$ wherein one X is H and the other $C_2H_5$, melting at about 85° C.

WILLIAM BRAKER.
MORRIS A. DOLLIVER.
EDWARD PRIBYL.
FRANKLIN A. SMITH.